US007503235B2

(12) United States Patent
Podkopayev

(10) Patent No.: US 7,503,235 B2
(45) Date of Patent: Mar. 17, 2009

(54) PEDAL ASSEMBLY

(75) Inventor: Vadym Podkopayev, Toronto (CA)

(73) Assignee: Intier Automotive Closures Inc., Newmarket, Ontario (CA)

( * ) Notice: Subject to any disclaimer, the term of this patent is extended or adjusted under 35 U.S.C. 154(b) by 0 days.

(21) Appl. No.: 11/130,322

(22) Filed: May 16, 2005

(65) Prior Publication Data

US 2005/0252334 A1 Nov. 17, 2005

(51) Int. Cl.
*G05G 1/14* (2006.01)
*F16H 53/00* (2006.01)
*F16H 53/06* (2006.01)

(52) U.S. Cl. ............................ 74/512; 74/560; 74/567; 74/569

(58) Field of Classification Search ........... 74/512–514, 74/560, 567, 569; 192/99 S; *B60T 13/02, B60T 7/06*
See application file for complete search history.

(56) References Cited

U.S. PATENT DOCUMENTS

| | | | | | |
|---|---|---|---|---|---|
| 1,754,354 | A | * | 4/1930 | Gans | 74/512 |
| 3,641,836 | A | * | 2/1972 | Boggs et al. | 74/512 |
| 3,789,967 | A | * | 2/1974 | Dau et al. | 192/111.12 |
| 4,319,497 | A | | 3/1982 | Shinto et al. | |
| 4,522,082 | A | | 6/1985 | Musumiya et al. | |
| 4,624,152 | A | | 11/1986 | Stotz et al. | |
| 5,038,907 | A | * | 8/1991 | Baumann | 192/99 S |
| 5,165,299 | A | | 11/1992 | Mizuma et al. | |
| 5,819,593 | A | * | 10/1998 | Rixon et al. | 74/514 |
| 6,155,385 | A | * | 12/2000 | Basnett | 188/72.7 |
| 6,250,176 | B1 | * | 6/2001 | Reimann et al. | 74/512 |
| 6,301,993 | B1 | * | 10/2001 | Orr et al. | 74/512 |
| 6,446,526 | B2 | * | 9/2002 | Reimann et al. | 74/512 |
| 6,679,366 | B2 | | 1/2004 | Tulaczko et al. | |
| 6,837,356 | B2 | * | 1/2005 | Tulaczko et al. | 192/99 S |
| 7,082,853 | B2 | * | 8/2006 | Fujiwara | 74/512 |
| 7,228,758 | B2 | * | 6/2007 | Fujiwara | 74/512 |
| 2004/0124059 | A1 | | 7/2004 | Tulaczko et al. | |
| 2005/0172753 | A1 | * | 8/2005 | Fujiwara | 74/512 |

FOREIGN PATENT DOCUMENTS

| | | | | |
|---|---|---|---|---|
| DE | 29 21 692 | | * | 1/1981 |
| DE | 29 21 692 | A1 | * | 1/1981 |
| EP | 0 608 155 | A1 | * | 7/1994 |
| EP | 0 919 903 | A1 | * | 6/1999 |
| JP | 1-231106 | | * | 9/1989 |
| JP | 2002-308084 | | * | 10/2002 |

OTHER PUBLICATIONS

PTO 06-4483, English translation of EP 0 919 903 A1, May 2006.*
English Abstract of JP 1-231106, Nobuyuki et al., Sep. 14, 1989.*
Translation of DE 2,921,692, Wolfgang Dau, Jan. 29, 1981, PTO 2008-1915.*

* cited by examiner

*Primary Examiner*—Vinh T Luong
(74) *Attorney, Agent, or Firm*—Clark Hill PLC

(57) ABSTRACT

A pedal assembly including a bracket, a pedal lever pivotally mounted to the bracket, a spring mounted to the bracket, and a cam pivotally mounted to the bracket. The cam engages one end of the spring so as to load the spring while the cam pivots. The cam has a pre-determined profile and the pedal lever engages the cam profile to pivot the cam and load the spring during the stroke of the pedal lever, thus enabling the assembly to provide a pre-determined force versus stroke profile.

5 Claims, 3 Drawing Sheets

PEDAL ASSEMBLY

FIELD OF INVENTION

The invention relates to the art of pedal assemblies.

BACKGROUND OF INVENTION

Pedal assemblies for controlling clutches often use an over-the-center spring mechanism to generate an initial force which resists the activation of the pedal. Once the pedal passes over the center of the mechanism, the spring assists somewhat in activating the pedal.

The problem with this solution is that the shape of the force vs. stroke profile is generally constrained. In some applications, the force vs. stroke profile cannot be adequately provided by an over-the-center spring mechanism.

A more robust solution is desired. In particular, it would be especially useful to tailor the force vs. stroke profile to the needs of any particular application.

SUMMARY OF INVENTION

According to one aspect of the invention a pedal assembly is provided which includes a bracket; a pedal lever pivotally mounted to the bracket; a spring mounted to the bracket; and a cam pivotally mounted to the bracket. The cam engages one end of the spring so as to load the spring as the cam pivots. The cam has a predetermined cam profile and the pedal lever engages the cam profile to pivot the cam and load the spring during the stroke of the pedal lever. The cam profile enables the force vs. stroke profile to be more readily tailored for ant given application.

BRIEF DESCRIPTION OF DRAWINGS

The foregoing and other aspects of the invention will be better understood from the following detailed description of preferred embodiments thereof in conjunction with the drawings, wherein.

DETAILED DESCRIPTION OF A PREFERRED EMBODIMENT

Figure 1:
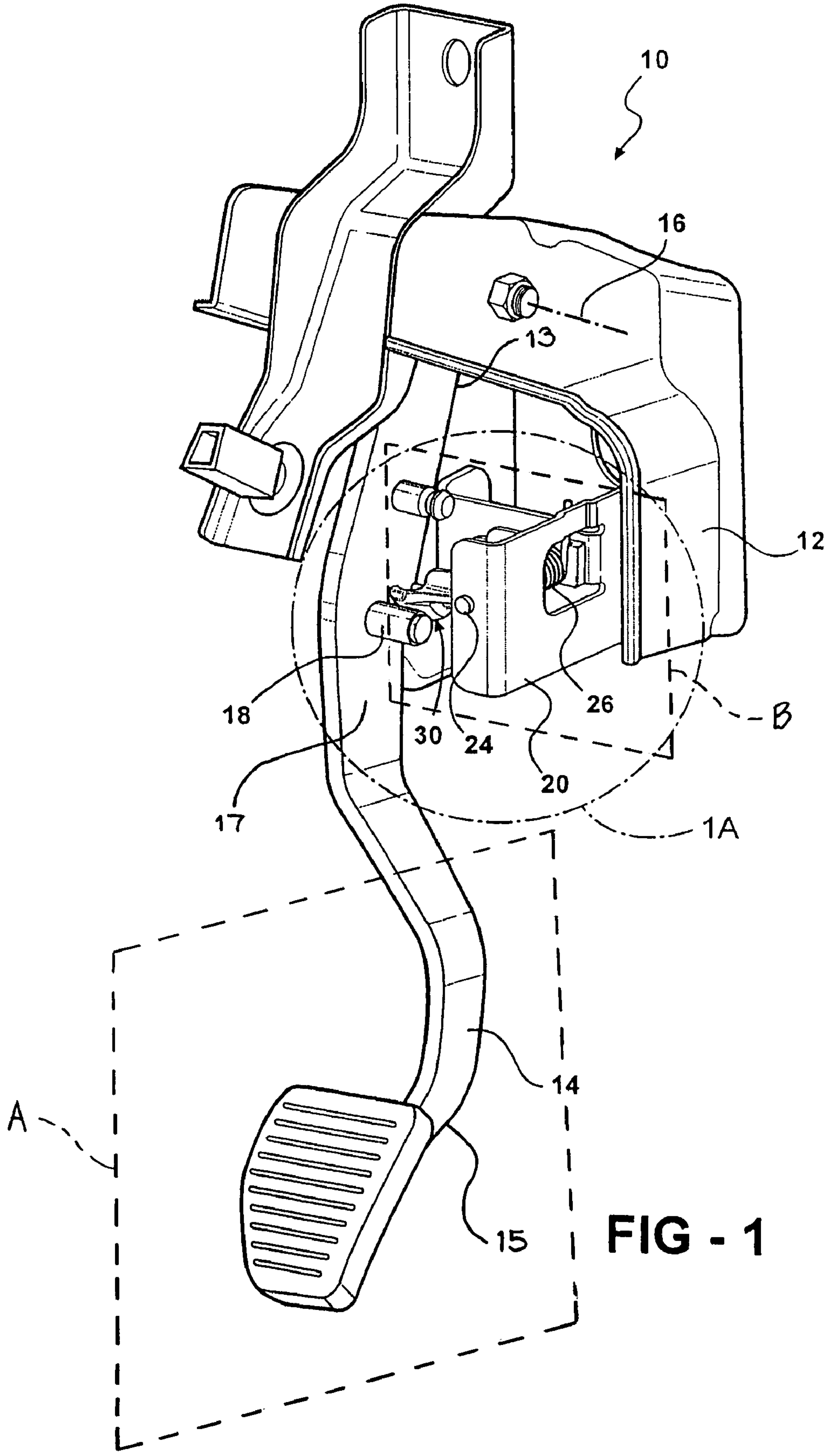
FIG. 1 is a perspective view of a pedal assembly according to a preferred embodiment of the invention.

FIG. 1 shows a pedal assembly 10 comprising a pedal lever 14 pivotally mounted to a bracket 12 about axis 16 as well known in the art. The pedal lever 14 includes a first end 13, and opposing second end 15, and a middle portion 17 disposed between the first 13 and second 15 ends. A roller 18 is mounted to the pedal lever 14. The roller 18 is mounted along the middle portion 17 of the pedal lever 14 spaced inwards from both the first 13 and second 15 ends. The pedal lever 14 pivots about the axis 16 in a first plane A.

Figure 1A:
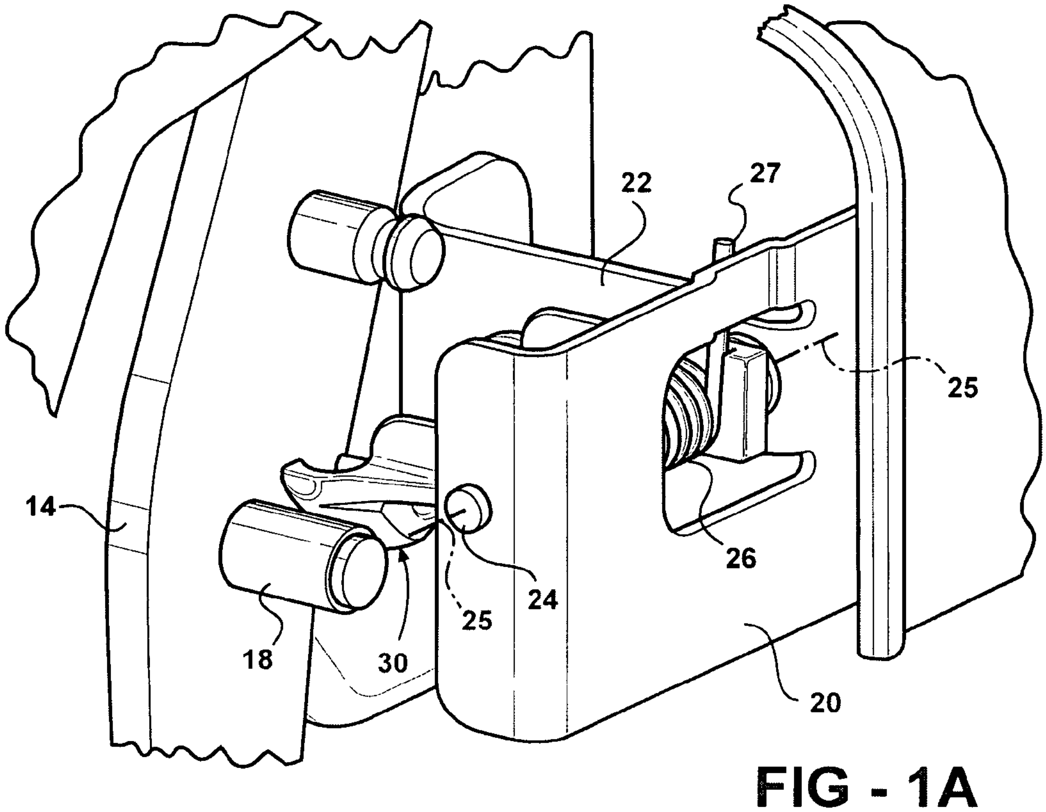
FIG. 1A is detailed view of the pedal assembly shown in FIG. 1.
Figure 2:
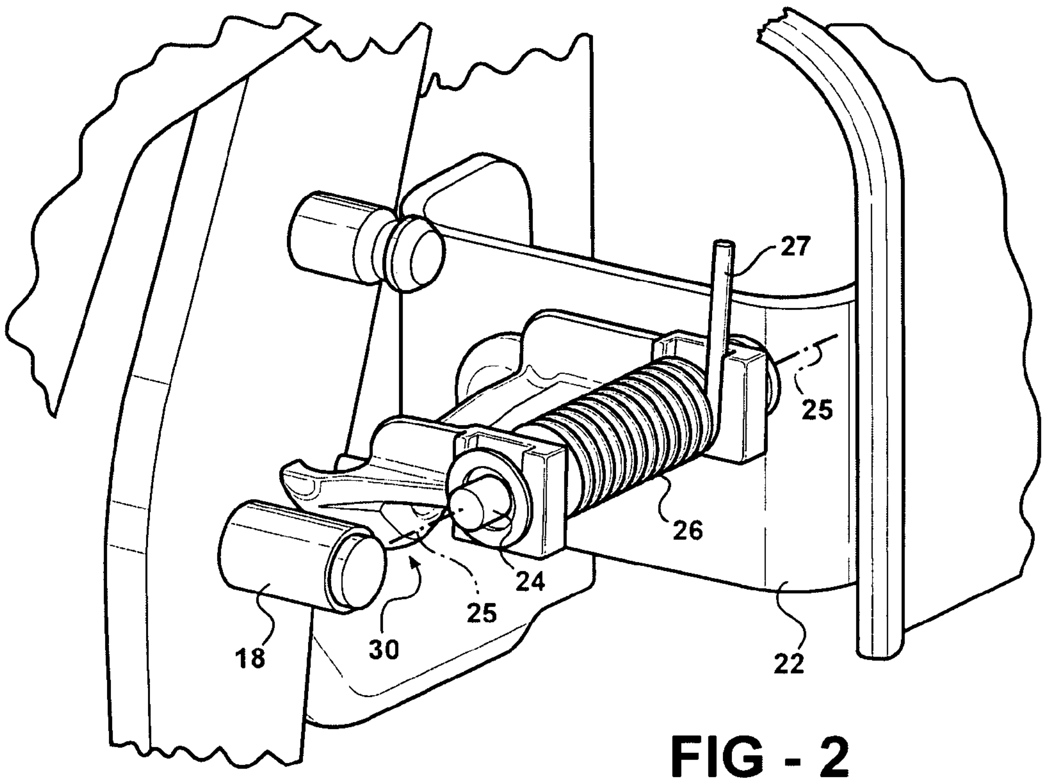
FIG. 2 is fragmentary perspective view of the pedal assembly shown in FIG. 1, with a bracket removed from the illustration.
Figure 3:
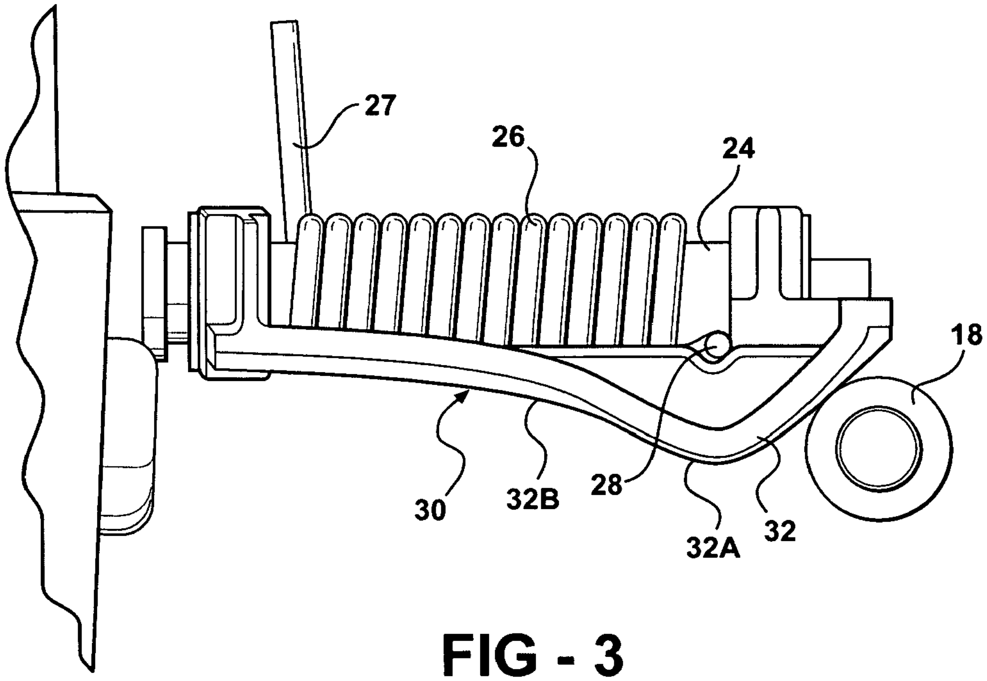
FIG. 3 is another fragmentary perspective view of the pedal assembly, with brackets, pedals and other supporting structure removed from the illustration.

The bracket 12 includes sub-brackets 20 and 22 which are rigidly connected to bracket 12 to form a box-like enclosure. The sub-brackets 20, 22 carry a shaft 24 along an axis 25, which is oriented generally perpendicular to the pedal rotational axis 16. A torsion spring 26 is fixedly mounted on the shaft 24. In addition, a cam 30 is journal-mounted to the shaft 24 so as to be rotatable about axis 25 in a second plane B, which is oriented generally perpendicular to the first plane A. As seen best in FIG. 3, one end 28 of spring 26 bears against the cam 30 and, as seen best in FIG. 1A, the other end 27 of the spring 26 bears against the sub-bracket 20.

Figure 4:
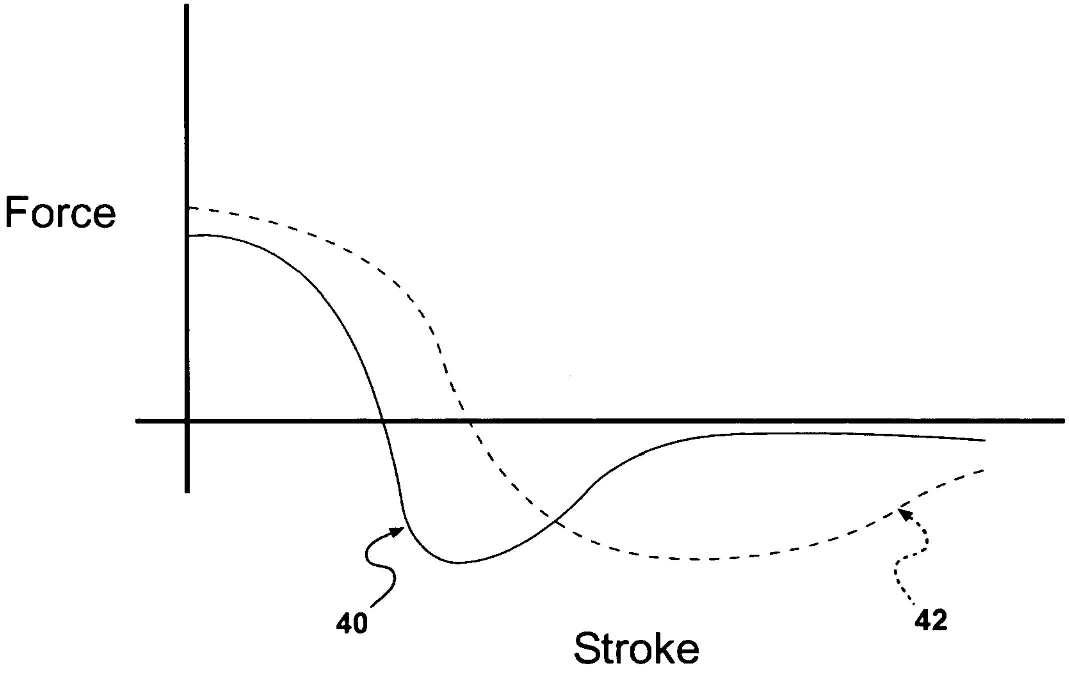
FIG. 4 is a graph showing the force vs. stroke profile of the preferred embodiment in relation to a prior art over the center toggle mechanism.

The cam 30 features a cam profile 32, seen best in FIG. 4. The roller 18, which functions as a cam follower, bears against the cam profile 32. When the pedal is in the rest position, the roller 18 is located in an initial position shown in FIG. 4. Due to the initial bulge 32A in the cam profile 32, activating the pedal lever 14 causes the roller 18 to push the cam upward (in a direction generally transverse to both axes 16 & 25) and twist spring 26. Consequently, a substantial force is required to initially activate the pedal. This force is related to the torsion characteristics of the spring rather the compression characteristics of the spring, and hence a generally sharper force vs. stroke profile 40 can be achieved, as seen in the comparison graph of FIG. 4, as compared to a prior art over-the-center toggle mechanism profile 42. Once the roller passes the bulge 32A, the spring 26 assists in the activation of the pedal lever 14. However, unlike the prior art, the cam profile 32B enables the assist force provided by the torsion spring 26 to be tailored to a predetermined profile.

In alternative embodiments, a compression spring may be used instead of a torsion spring. For example, a sub-bracket may be mounted above the cam with a spring extending between the bracket and the cam that would be compressed as the cam pivots upward. Those skilled in the art will understand that a variety of other modifications may be made to the embodiments described herein without departing from the spirit of the invention.

What is claimed is;

1. A pedal assembly, comprising:

a bracket;

a pedal lever pivotally mounted to the bracket along a first axis, the pedal lever pivotal about the first axis in a first plane, and the pedal lever having opposing first and second ends and a middle portion disposed therebetween;

a roller mounted to the pedal lever at the middle portion;

a spring mounted to the bracket; and a cam pivotally mounted to the bracket along a second axis oriented perpendicularly to the first axis, the cam pivotal about the second axis in a second plane perpendicular to the first plane, and the cam engaging one end of the spring so as to load the spring as the cam pivots;

wherein the cam has a pre-determined cam profile and the roller engages the cam profile to pivot the cam in the second plane and load the spring during the stroke of the pedal lever in the first plane.

2. A pedal assembly according to claim 1, wherein the cam twists the spring.

3. A pedal assembly comprising:

a bracket;

a pedal lever pivotally mounted to the bracket along a first axis, the pedal lever pivotal about the first axis in a first plane;

a roller mounted to the pedal lever;

a shaft fixedly secured to the bracket;

a spring fixedly mounted on the shaft; and a cam pivotally mounted to the bracket along a second axis oriented perpendicularly to the first axis, the cam pivotal about the second axis in a second plane perpendicular to the first plane, and the cam directly engaging one end of the spring so as to load the spring as the cam pivots;

wherein the cam has a pre-determined cam profile and the roller engages the cam profile to pivot the cam in the second plane and load the spring during the stroke of the pedal lever in the first plane.

4. A pedal assembly comprising:

a bracket;

a pedal lever pivotally mounted to the bracket along a first axis, the pedal lever pivotal about the first axis in a first plane;

a spring mounted to the bracket; and a cam pivotally mounted to the bracket along a second axis oriented perpendicularly to the first axis, the cam pivotal about the second axis in a second plane perpendicular to the first plane, and the cam directly engaging one end of the spring so as to load the spring as the cam pivots;

wherein the cam has a pre-determined cam profile and a portion of the pedal lever engages the cam profile to pivot the cam in the second plane and load the spring during the stroke of the pedal lever in the first plane.

5. A pedal assembly according to claim 4, wherein the spring includes one end bearing against the bracket and an opposing end bearing against the cam.

* * * * *